US005500526A

United States Patent [19]

Shalvi et al.

[11] Patent Number: 5,500,526

[45] Date of Patent: Mar. 19, 1996

[54] MONITORING DEVICE FOR MONITORING THE PASSAGE OF OBJECTS THROUGH PASSAGE

[75] Inventors: Ram Shalvi; Christopher A. W. Kleinau, both of Hong Kong, Hong Kong

[73] Assignee: Solar Wide Industries, Ltd., Kwai Chung, Hong Kong

[21] Appl. No.: 249,853

[22] Filed: May 26, 1994

[30] Foreign Application Priority Data

Jun. 11, 1993 [EP] European Pat. Off. .............. 93304548

[51] Int. Cl.[6] .............................. G01V 9/04

[52] U.S. Cl. .............................. 250/222.1; 340/568

[58] Field of Search .............................. 250/222.1, 222.2, 250/223 R, 561; 340/568, 572, 556, 540, 933; 186/62, 63

[56] References Cited

U.S. PATENT DOCUMENTS 3,457,423 7/1969 Gravely .............................. 186/62
3,725,894 4/1973 Geisler .............................. 340/568
4,338,594 7/1982 Holm .............................. 340/568

FOREIGN PATENT DOCUMENTS 0175885 4/1986 European Pat. Off. .
8812330 2/1989 Germany .
2028647 3/1980 United Kingdom .

*Primary Examiner*—Edward P. Westin
*Assistant Examiner*—Que T. Le
*Attorney, Agent, or Firm*—Omri M. Behr; Matthew J. McDonald

[57] ABSTRACT

A supermarket trolley monitoring system is provided for detecting shopping items on a lower shelf of the trolley as the trolley moves through a check-out station. Three transmitter/receivers are provided. The first and third at level A respond to light reflected by a panel 36 on the side of the trolley. The system is turned on when the panel 36 passes the first transmitter/receiver and off when the panel 36 passes the third transmitter/receiver. The second transmitter/receiver is mounted above A and if any object is detected while the system is ON, by reflection of the beam from the object, a warning is provided to alert a check-out assistant and/or a shopper that an item is present on the lower trolley shelf which may not have been entered in a till.

10 Claims, 3 Drawing Sheets

MONITORING DEVICE FOR MONITORING THE PASSAGE OF OBJECTS THROUGH PASSAGE

The invention relates to monitoring devices for monitoring the passage of objects.

The invention relates more particularly although not exclusively to monitoring devices in which the device has transmitter/receivers which transmit radiation signals towards an object to be detected and detect any signals reflected from the object. The devices may be used for detecting any objects or only particular objects or persons passing in front of the device. Devices of the present invention have particular application for use in supermarkets at check out or exit points and monitor trolleys passing nearby the devices. Examples of such devices are described in European Patent application 0175885 and in UK Patent specification 2028647.

SUMMARY OF THE INVENTION

According to the invention there is provided a monitoring device for monitoring passage of objects comprising three radiation transmitter/receivers arranged to transmit and receive respective beams of radiation in the same general direction but laterally spaced apart so as to detect objects passing the device in the lateral direction and which interrupt the radiation in use, in which the device is arranged in use to be activated for detecting the objects by interruption of the beam of the first transmitter/receiver, to detect thereafter any object which interrupts the beam of the second transmitter/receiver while the device is activated, and be deactivated by interruption of the beam of the third transmitter/receiver.

The transmitter/receivers may transmit and receive light radiation.

The transmitted signals may be pulsed and the receiver arranged to respond only to like pulsed reflected signals. The pulses may be of short duration and/or have spiked waveforms.

The receivers may be arranged to respond only to reflected signals which are phase shifted from the transmitted signals within a predetermined range.

According to another aspect of the invention there is provided a system for monitoring a part of a supermarket trolleys during their passage through a monitoring station including a monitoring device with transmitter/receivers as outlined above, each supermarket trolley having a radiation reflective patch positioned to interrupt the beams of the first and third transmitter/receivers when the trolley moves through the monitoring station in the lateral direction.

A patch may be mounted on each opposite corner of the trolley so that the monitoring system is activated and deactivated in the same manner whether the trolley moves forwards or backwards through the monitoring station.

A voice message store may be provided and arranged to broadcast a voice message whenever an object interrupts the beam of the second transmitter/receiver. Another voice message may be generated whenever the monitoring device is deactivated.

BRIEF DESCRIPTION OF THE DRAWINGS

Monitoring devices and monitoring systems for use in a supermarket will now be described by way of example with reference to the accompanying drawings in which.

DESCRIPTION OF THE PREFERRED EMBODIMENTS

Figure 1:
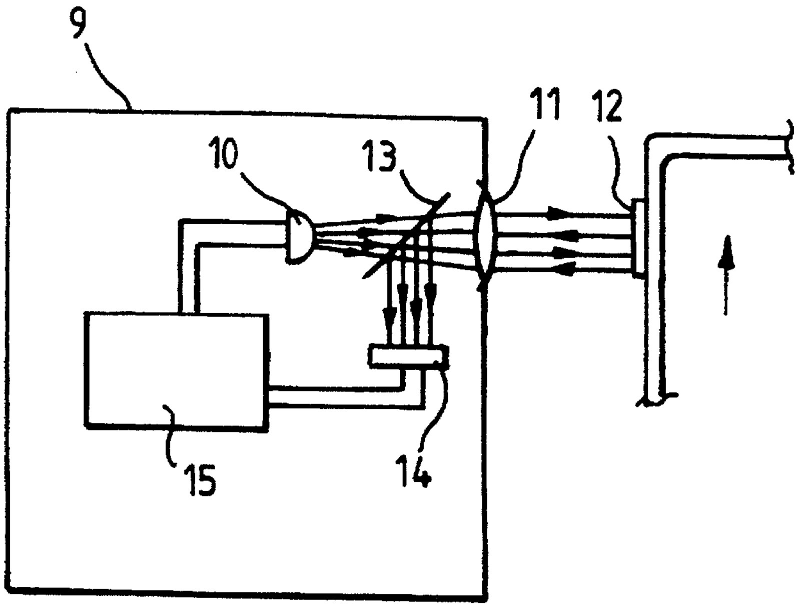
FIG. 1 shows a schematic arrangement of one monitoring device.

Referring to the drawings, in FIG. 1 the monitoring device includes a housing 9 in which is mounted a light emitting diode (LED) 10 arranged to transmit light via a lens 11 in a narrow beam out of the housing towards an object to be detected. In this embodiment, an object is a small reflective panel 12 on a supermarket trolley frame or a shopping item on a shelf of the trolley to be explained more fully below. Light interrupted and reflected by the panel 12 passes through the lens 11 and is reflected by a half mirror 13 towards a light receiver or sensor 14. An electric controller 15 is provided to supply the LED 10 and respond to light falling on the receiver 14. The components 10, 11, 13, 14, and 15 form, in effect, a radiation transmitter/receiver.

Figure 2:
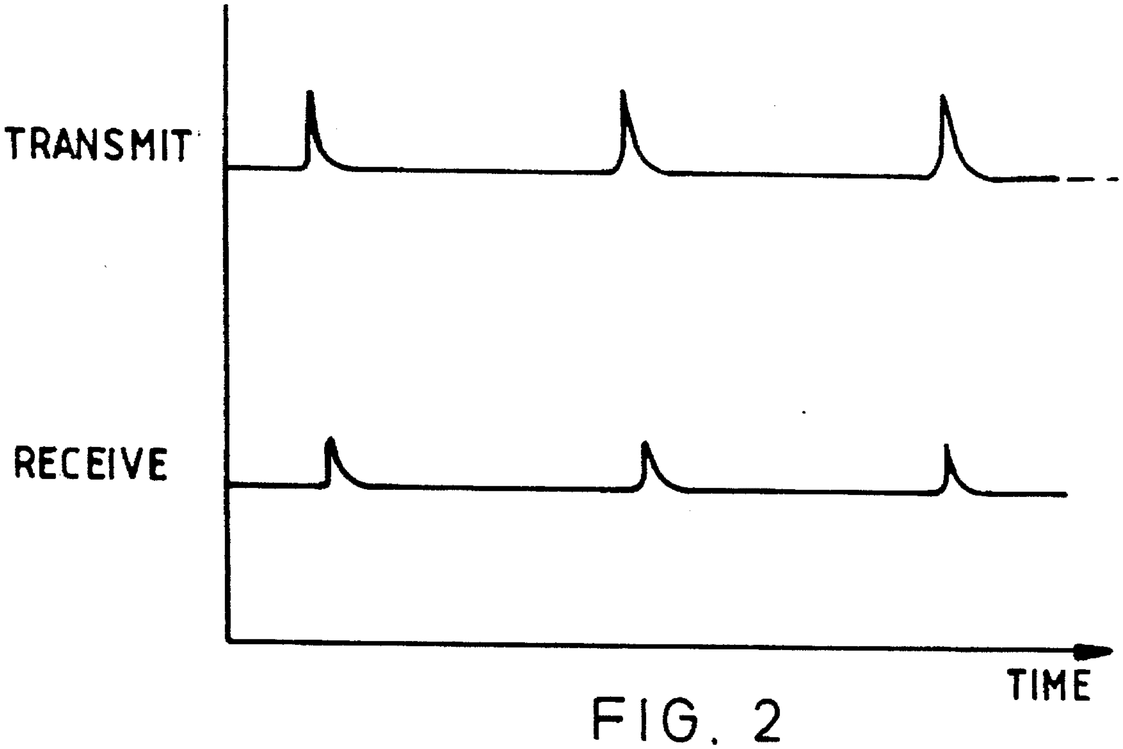
FIG. 2 shows a graph of light pulses used by the device.

The LED 10 is controlled to transmit pulsed or spiked light output signals as illustrated in FIG. 2 at a frequency of about 1 $KH_z$. The receiver 13 is arranged to respond only to pulsed signals with the same or approximately the same mark/space ratio so that spurious light from other sources does not interfere with the satisfactory operation of the transmitter/receiver. In order to make the transmitter/receiver operation completely immune to spurious light having the same or similar mark to space ratio (or frequency), the controller 15 is arranged to respond only to signals received at the lens from outside the housing which have a small phase shift from the signals generated by the LED 10. In fact, the controller 15 can be arranged to respond to only suitably phase shifted signals whether the LED output is pulsed or not. In any event the phase shift set up for detection especially as any shopping item detected or the panel 12 will always be predictably spaced within known distances from the housing 9 due to the constraints provided in practice by the relative position of a trolley passageway adjacent the monitoring device. Generally, this distance is between 50 and 80 cm and the phase shift to which the device responds is suitably set for such a range of distances.

A preferred monitoring signal has a frequency of 38 $KH_z$ which is modulated by pulses of 1 $KH_z$.

A further advantage arises if the output of the LED 10 is pulsed generally in the manner illustrated in FIG. 2 because the electrical energy required is very low. This means that a battery power back-up can be reasonably used in practice because only very little power is required to drive the LED 10. This enables the monitoring device to operate for a reasonable time in the event of a mains power failure for example.

Figure 3:
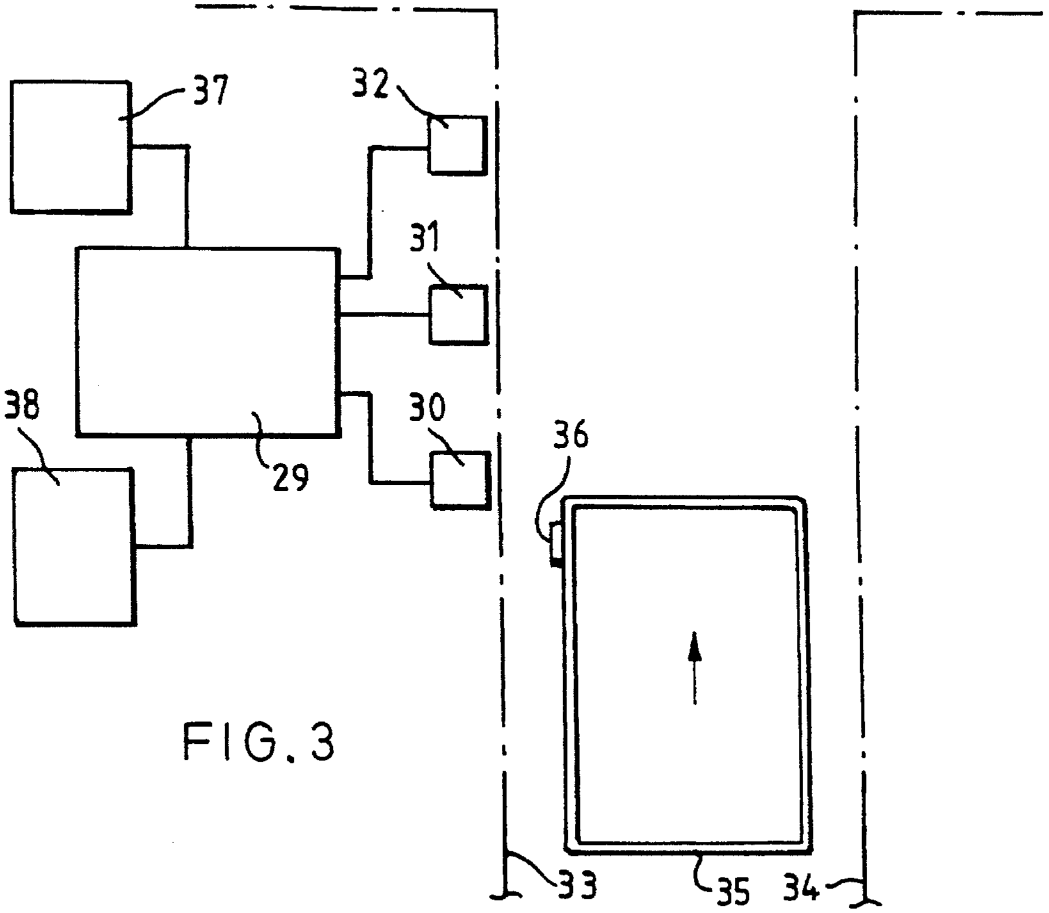
FIG. 3 shows diagrammatically a layout of one system.
Figure 4:
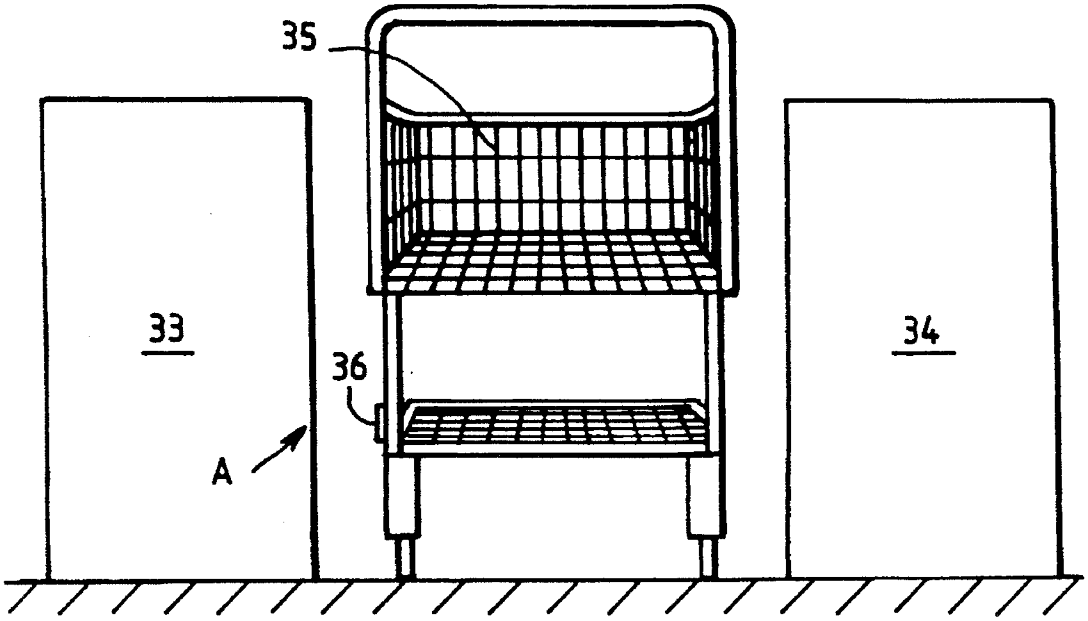
FIG. 4 shows a location for the system.

In FIGS. 3 and 4, the monitoring system has a central controller 29 and a monitoring device with its three transmitter/receivers shown positioned at 30, 31 and 32 next to a trolley passageway defined by a channel between check-out counters 33 and 34, shown chain dotted in FIG. 3. A trolley 35 shown only in outline in FIG. 3 is provided with a patch or small reflector panel 36 on a front left corner at the same height above the ground as the transmitter/receivers 30 and 32, see A in FIG. 4. The transmitter/receiver 31 is somewhat above A and so that its light beam extends to be interrupted by any shopping items on the lower shelf of the trolley. When the trolley 35 enters a monitoring station, that is, moves between the check-out counters 33 and 34 where shopping items will normally be checked for payment by a cashier, the patch 36 reflects the beam of light produced by the transmitter/receiver at 30 to activate the monitoring device. When the trolley leaves the monitoring station, the panel 36 reflects the beam of light of the transmitter/receiver at 32 to de-activate the monitoring device. While the monitoring device is activated and as the trolley moves through the monitoring station, any items on a lower shelf of the trolley, under a main carrying basket, interrupts and reflects the beam of light from the transmitter/receiver 31 to provide a suitable image on a display 37 or audible warning signal via a loudspeaker 38 for the cashier. This alerts the cashier that an item or items are being carried through the monitoring station on the shelf of the trolley which in normal circumstances would or may not be otherwise noticed. Such an occurrence is often non-deliberate but could be where an attempt is being made by a shopper to avoid payment. In any event, the cashier and possibly also the shopper, will be alerted so that the shopping transact ion can be corrected as necessary.

With the described arrangement, the trolley 35 may also be fitted with a second panel 36 on an opposite corner of the trolley and at the same height, so that the system will operate equally well if the trolley is taken backwards between the counters 33 and 34.

As explained above, the warning signal may be a voice signal supplied by a voice message store incorporated in the controller 29 when an undisclosed item is detected on a lower tray, or under the main shopping basket of the trolley 35. It is also possible where desired to provide a voice message, such as a courtesy message or an advertisement, whenever the monitoring device is deactivated. This means that as the trolley 35 passes out of the passageway, usually when the cashier has received payment, a courtesy or other voice message is broadcast thanking the shopper for his custom, for example.

The turning on and off of the systems may be monitored to provide a count of the number of trolleys passing through a check-out area, and for statistically purposes, the number of occurrence of finding unpaid or unchecked shopping items on the lower shelf can also be recorded.

Figure 5:
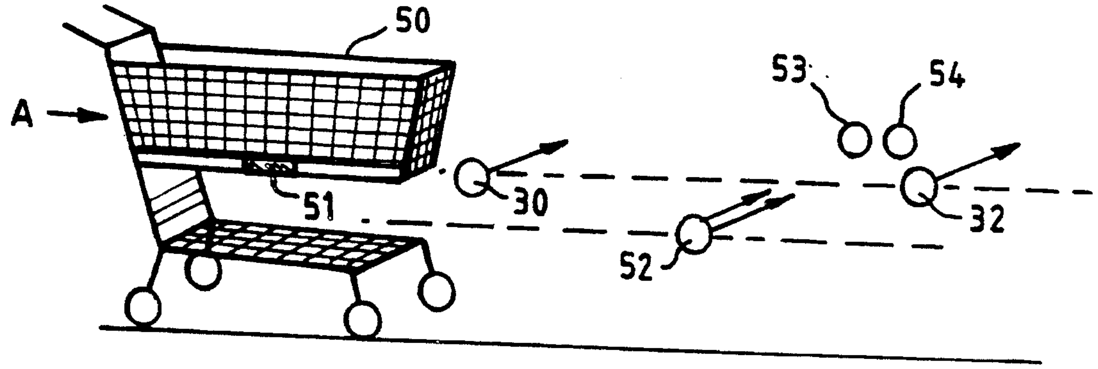
FIG. 5 shows a schematic arrangement of a second monitoring system.

In FIG. 5, a supermarket 50 trolley has a reflective panel 51 mounted approximately at it centre. In fact, the trolley has a second panel (not shown) on its opposite side as well so that the trolley may be moved through a check-out area either forwards or backwards. The reflective panels serve to switch on the monitoring system in the same manner as described earlier by interruption and reflection of a transmitted beam by the panel 51.

A transmitter 52 which transmits a wider angled beam is mounted generally at a level of any objects on the lower shelf of the trolley. Opposite the transmitter 52 on the other side of a trolley passageway are two suitably mounted receivers 53 and 54 separated in normal direction of travel of the trolley (indicated by an arrow A) by about 2 cms. (The transmitter 52 and receivers 53 and 54 are equivalent in function to transmitter/receiver 31 in FIG. 3.) The monitoring circuit is arranged to respond only to the occurrence of both receivers being simultaneously obscured for receiving light signals from the transmitter 52 and only if such occurrence occurs for more than say 50 to 500 milliseconds. Preferably however, this obscured time period is readily adjustable by a service engineer so as to be able to adapt this time period to particular practical experiences of each shopping environment. Without two receivers, it is possible that vertical extending parts of the trolley obscure one receiver at any one time or that, if the trolley is swivelled, vertical wires may momentarily obscure both receivers. Generally, however by having two adjacent receivers and by also incorporating a suitable time delay as described, malfunctions of the monitoring system are satisfactorily illiminated. In this way, erroneous signals about unpaid items on the lower shelf are rarely generately, if at all.

Figure 6:
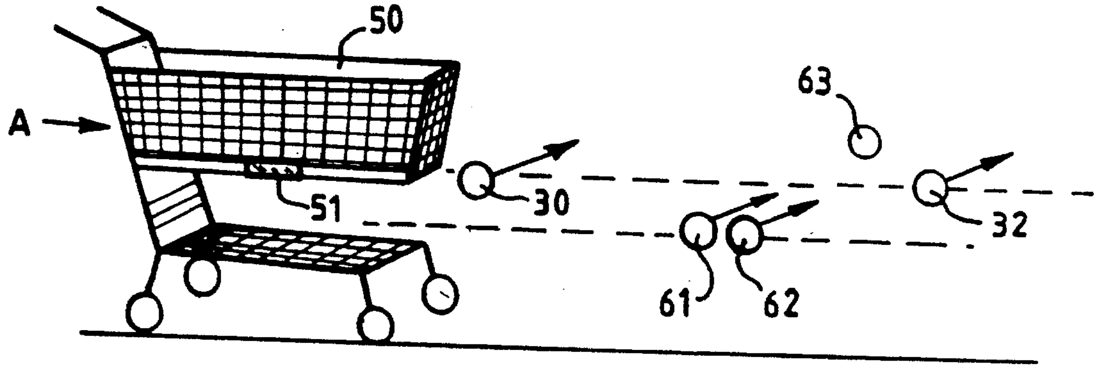
FIG. 6 shows a schematic arrangement of a third monitoring device.

In FIG. 6, the arrangement is very similar to the arrangement of FIG. 5. Two transmitter/receivers 61 and 62 are positioned side by side effectively about 2 cms. apart. A reflector 63 is mounted above the floor on an opposite side of the check out area to the transmitter/receivers 61 and 62. Light directed towards the reflector will be interrupted by any shopping items on the lower shelf of the trolley. The monitoring device is arranged to respond to such interruptions only if the light of both transmitter/receivers 61 and 62 is interrupted simultaneously and for at least 50 to 500 milliseconds or more. In principle therefore, the device responds in the same manner as the device of FIG. 5. However, in the arrangement described in FIG. 6, the same transmitter/receivers units can be used for all the transmitter/receivers that is 30, 32, 61 and 62. However, the transmitter/receivers 61 and 62 are arranged to respond to a loss of reflected light rather than a presence (caused by the panel 51) of reflected light when appropriate.

It will be noted that in the arrangement of FIG. 6, the device could operate with only one or other of the transmitter/receivers 61 or 62. However, for most practical applications, it is better to have at least two transmitter/receivers arrangements to monitor the lower shelf of the trolley as described. The transmitter/receivers 61 and 62 may also be arranged with phase-shift discrimination so that only light reflected which is suitably phase-shifted from the reflector 63 maintains the transmitter/receivers 61 and 62 response in a quiescent state.

It will be appreciated that in the arrangement described with reference to FIG. 3, the transmitter/receiver may also incorporate a relatively wide beam transmitter and two (or more) adjacent receivers. As such the monitoring system will only respond to provide the warning signals if both or all receivers receive a reflected signal at the same time for a suitable period of time. It will be recalled that because the monitoring system can also be arranged to respond only to objects (on the lower shelf) which are within say 80 cm., by phase—shift discrimination of received signals, very few, if any, malfunctions will occur.

Generally, it is often preferable to include a certain delayed response in the various arrangements even when only one transmitter and receiver are used. For example, a short delay may be incorporated for the transmitter/receivers 30 and 32 to illiminate any random reflections from a stray object triggering the monitoring device. Likewise, but generally with a much longer delay, say 1 or 2 seconds, the operation of the transmitter/receiver 31 is inhibited to avoid being falsely triggered possibly by vertical wires of the trolley itself.

In embodiments of the invention, the turning on and off of the monitoring devices is usually carried out by interrupting a light beam and reflecting it back towards a receiver near or incorporated with its transmitter as described. However, the device could for example be turned on and off by having a suitable transmitter/receiver, comprising a transmitter at one side of the check out area and receivers at the other side. Likewise, the region of the lower shelf of the trolley can be monitored by detecting interruption of a beam of radiation, either in the sense of reflecting the radiation towards a receiver or of blocking off the beam to a receiver.

It is also preferable in some applications to include an extra transmitter/receiver mounted adjacent or with a line-of-sight generally adjacent the transmitter/sensor 30. The extra transmitter/receiver is arranged to turn the system off just before it is turned on by the transmitter/receiver 30 in normal passage of the trolley through the check-out station. The action of the extra transmitter/receiver ensures in case of some extraneous signals being received or, say, partial reversal of the trolley in to the check-out station that the system is always turned off as the trolley first proceeds through the check-out station.

We claim:

1. A monitoring device for monitoring passage of objects comprising three radiation transmitter/receivers arranged to transmit and receive respective beams of radiation in the same general direction but laterally spaced apart so as to detect objects passing the device in the lateral direction and which interrupt the radiation in use, in which the device is arranged in use to be activated for detecting the objects by interruption of the beam of the first transmitter/receiver, to detect thereafter any object which interrupts the beam of the second transmitter/receiver while the device is activated, and be deactivated by interruption of the beam of the third transmitter/receiver.

2. A monitoring device according to claim 1, in which the second transmitter/receiver comprises two or more separate transmitter/receivers arranged adjacent and laterally side by side, the monitoring device being arranged to detect any object which interrupts both or all the respective beams of the second transmitter/receiver simultaneously.

3. A monitoring device according to claim 2, in which the monitoring device is arranged to detect only objects which simultaneous interrupt the beams for more than at least a short time period.

4. A monitoring device according to claim 1, in which the transmitter/receivers transmit and receive light radiation.

5. A monitoring device according to claim 1, in which transmitted beams of radiation are pulsed and the receivers are arranged to respond only to like pulsed beams.

6. A monitoring device according to claim 5, in which the pulses are of short duration and/or have spike waveforms.

7. A monitoring device according to claim 5, in which the receivers are arranged to respond only to beams which are phase shifted from the transmitted beams within a predetermined range.

8. A system for monitoring objects supported on a supermarket trolley during its passage through a monitoring station including a monitoring device according to claim 1.

9. A system according to claim 8 in which the supermarket trolley has a radiation reflective patch positioned to interrupt beams of the first and third transmitter/receivers when the trolley move through the monitoring station in the lateral direction.

10. A system according to claim 9, in which the patch is mounted on each opposite side or corner of the trolley so that the monitoring device is activated and de-activated in the same manner whether the trolley moves forwards or backwards through the monitoring station.

* * * * *